Patented Oct. 8, 1946

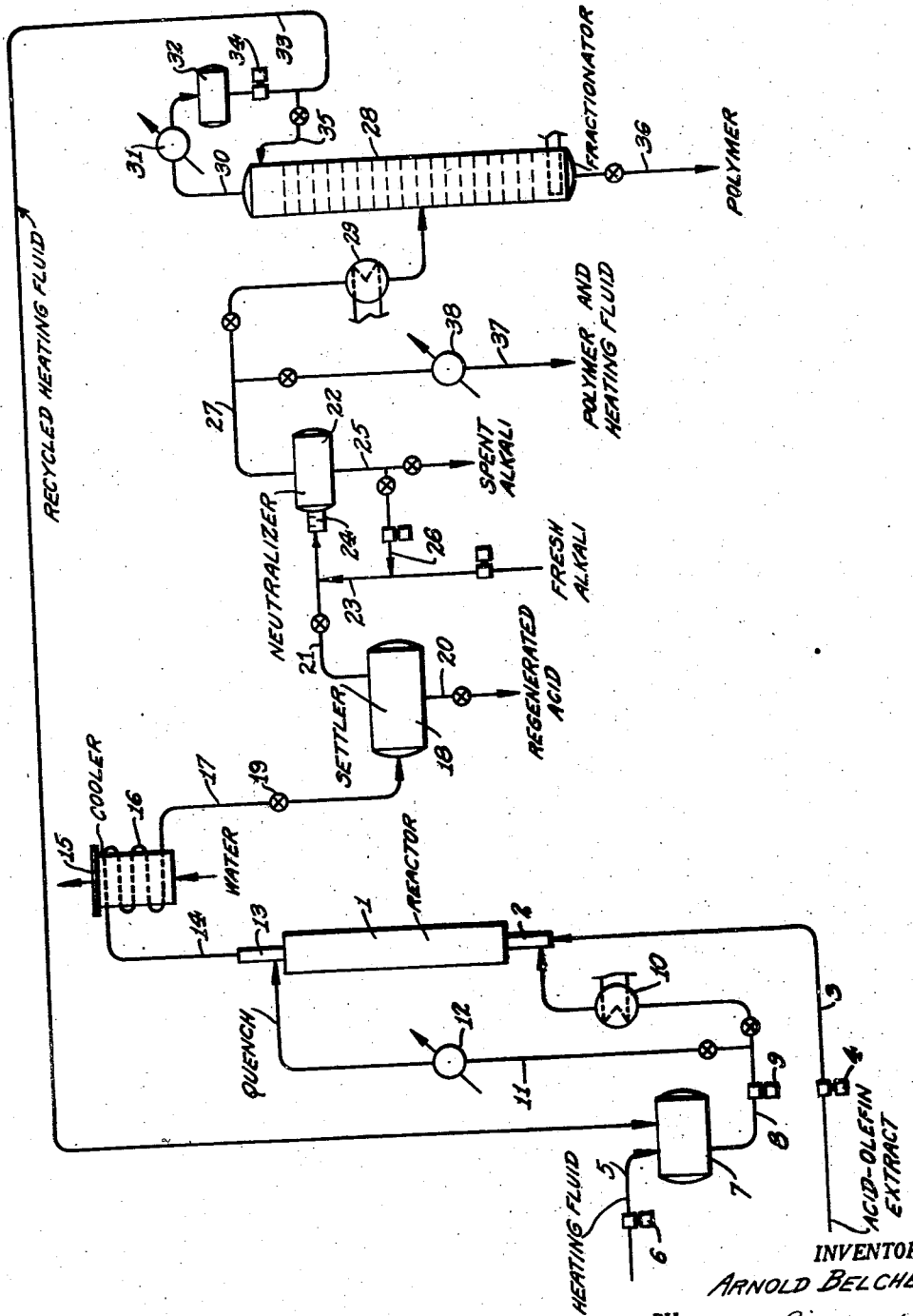

2,408,725

UNITED STATES PATENT OFFICE 2,408,725

HYDROCARBON CONVERSION

Arnold Belchetz, Kew Gardens, N. Y., assignor to The M. W. Kellogg Company, Jersey City, N. J., a corporation of Delaware Application September 4, 1942, Serial No. 457,530

15 Claims. (Cl. 260—683.15)

This invention relates to an improved method for producing olefin polymers. More particularly, the invention relates to an improvement in the method in which olefins are first absorbed in a liquid acid polymerizing catalyst, and the extract is then heated to polymerize the absorbed olefins.

Olefin hydrocarbons may be absorbed at relatively low temperatures in a liquid acid polymerizing catalyst such as sulfuric acid or hydrofluoric acid, and the absorbed olefins may then be polymerized by heating the extract to a suitable polymerizing temperature.

The conditions under which olefin hydrocarbons are absorbed by the liquid acid polymerizing catalyst depend upon the molecular weight of the olefin hydrocarbon and also upon the molecular structure thereof. For example, in the absorption of butylenes in sulfuric acid it is found that isobutylene is absorbed to a substantial degree at temperatures which are too low to effect substantial absorption of the normal butylenes. The selectivity of the absorption of isobutylene is effected also by the strength of the acid, the ratio of acid to butylenes and the time of contact.

The selective absorption of isobutylene from a mixture including normal butylenes is the "cold acid" process which has been used extensively for the manufacture of tertiary butyl alcohol or in the preparation of di-isobutylene for hydrogenation to iso-octane.

The invention will be described further by specific reference to a modification of the "cold acid" process, although it will be readily understood that the invention is not limited to such specific application but includes within its scope the polymerization of any olefin hydrocarbon by successive absorption of the olefin hydrocarbon in the liquid acid catalyst and polymerization of the absorbed olefin by heating the extract. The "cold acid" polymerization of isobutylene is selected as the specific example of the application of the invention for the reason that it is an important step in the production of isooctane and is a valuable method for separating isobutylene from normal butylenes prior to subjecting the latter to dehydrogenation for the production of butadiene. It will be understood, however, that the invention is applicable also to the polymerization of olefins having a greater or less number of carbon atoms per molecule than isobutylene and is applicable also to the polymerization of olefin hydrocarbons other than iso-olefins such as normal olefins and diolefins. For example, the process is applicable to the polymerization of normal butenes or butadienes although these applications of the invention are at present less important than the polymerization of isobutylene.

In the further description of the invention reference will be made to the use of sulfuric acid as the liquid acid polymerizing catalyst. It is to be understood, however, that the invention is not limited to the use of this specific catalytic agent but includes the use of other liquid acid catalysts, such as hydrofluoric acid, which are capable of absorbing olefin hydrocarbons at temperatures below polymerizing temperatures and promoting polymerization of the absorbed olefins when the extract is heated to a suitable temperature.

In the selective absorption of isobutylene in sulfuric acid a mixture of gases containing isobutylene, normal butenes and any accompanying paraffin hydrocarbons is contacted with the sulfuric acid under conditions effective to produce the desired absorption of isobutylene by the acid. These conditions are selected, with respect to the use to which the polymers and the remaining normal butenes are to be put, to produce a greater or lesser degree of absorption of normal butylenes along with the isobutylene. When the principal purpose of the process is to obtain di-isobutylene for hydrogenation to iso-octane a greater degree of absorption of normal butylenes is tolerable than in an operation carried out for the primary purpose of producing normal butylenes, substantially free of isobutylene, as a source material for the production of butadiene. In operating the process as a preliminary step for the production of butadiene it is desirable to effect as complete as practicable a removal of isobutylene from the mixture by absorption while keeping the absorption of normal butylenes at a practical minimum.

The isobutylene-acid extract is separated from the unabsorbed hydrocarbons, and the latter are then transferred elsewhere for further use, such as in the production of butadiene. The extract is then treated to regenerate the acid. This may be done by heating the extract to a temperature sufficiently high to polymerize the absorbed olefins or by diluting the extract to a lower acid strength and heating the dilute extract to evolve the isobutylene or by diluting the extract to a still lower acid strength and heating the dilute extract to evolve tertiary butyl alcohol. In the methods involving dilution the acid necessarily must be reconcentrated for further use in the absorption step. Preferably, therefore, the extract is treated without dilution to polymerize the olefins and regenerate the acid at the strength required for the absorption step. Relatively concentrated sulfuric acid having a strength between 63 and 67 per cent is preferred for selective absorption of isobutylene. At lower concentrations the rate of absorption decreases, and the rate of corrosion of steel equipment increases. At higher acid strengths the rate of absorption of normal butylenes increases.

The polymerization of the isobutylene absorbed in the extract presents serious difficulties in commercial operations because the corrosive effect of the acid is greatly intensified when the extract is heated to the temperatures necessary to effect polymerization of the absorbed isobutylene. Previous practice in the commercial "cold acid" polymerization of isobutylene involves heating the extract by passage thereof through externally heated coils consisting of copper or steel or lead. Heating coils made of steel or copper have a relatively short life due to the corrosive effect of the extract and require frequent replacement. By using thick walled lead coils a somewhat longer useful life is attained, but these also require replacement at a frequency which, in view of the expense of the tubes, is undesirable.

In accordance with the present invention the isobutylene-acid extract is heated to the polymerizing temperature, without contact at the extract with the above-mentioned metal coils at the polymerizing temperature, by contacting the extract with a hot fluid whereby the extract is heated to a temperature sufficiently high to polymerize the absorbed isobutylene. Preferably, heating of the extract is effected by contacting the extract with a vaporized fluid which is condensed by contact with the extract, the sensible heat and heat of vaporization of the fluid being sufficient to impart to the resulting mixture a temperature sufficiently high to polymerize the isobutylene. Preferably also polymerization of the isobutylene is effected by contacting the extract with a vaporized fluid which is similar in boiling characteristics to isobutylene. For example, the polymerization of the absorbed isobutylene is effected advantageously by mixing the extract with vaporized butane, either isobutane or normal butane, the temperature of the butane and the proportions of the butane and extract being regulated to produce a liquid mixture of the butane and extract at the desired polymerizing temperature.

The use of normal butane or isobutane is especially advantageous because of the relationship of the boiling points of these materials to the boiling point of isobutylene. Since it is preferable to effect polymerization of the isobutylene while maintaining the extract in a liquid condition, it is desirable to maintain the polymerization reaction zone at a pressure sufficiently high to prevent vaporization of isobutylene. When using normal butane as the heating fluid the pressure which is maintained on the reaction zone to prevent vaporization of isobutylene is sufficient to insure condensation of the vaporized normal butane when it is mixed with the extract. When using vaporized isobutane as the heating fluid it is necessary only to apply a slightly higher pressure on the reaction zone to insure condensation of the isobutane and the release of the heat of vaporization thereof.

Normal butane and isobutane are preferred agents as heating fluids for polymerizing isobutylene because of their relative inertness in the reaction and because of their relationship to the boiling characteristics of the isobutylene. It is evident, however, that if the sensible heat of the heating fluid is sufficient alone to produce the desired polymerizing temperature, any gas or vapor may be used which does not condense on being mixed with the extract, or any unvaporized liquid may be employed. It is evident, also, that for the polymerization of olefin hydrocarbons other than isobutylene by means of a condensible heating fluid other heating fluids than the butanes having different boiling characteristics may be employed.

Ordinarily, low-boiling hydrocarbons such as those having three, four or five carbon atoms per molecule are preferred because of the relationship of their boiling characteristics to the boiling characteristics of the isobutylene and because they are readily separable from the resulting polymers by fractionation. While the use of lower boiling or higher boiling materials is within the scope of the invention, these are practical ordinarily for use in the polymerization of isobutylene only when the sensible heat of the heating fluid is sufficient to heat the extract to the polymerizing temperature. Relatively low-boiling heating fluids require the application of an excessively high pressure to maintain liquid phase conditions in the reaction zone, whereas higher boiling materials require heating the heating fluid to an excessively high temperature to vaporize it at the pressure necessary in the reaction zone.

In the selection of a heating fluid those materials should be avoided which will produce undesirable by-products either by reaction with themselves or with the isobutylene polymers or which react with the acid catalyst to deactivate it. Low-boiling saturated paraffin hydrocarbons such as propane, the butanes and pentanes are advantageous heating fluids because of their relative inertness in the reaction zone. However, the use of other low-boiling hydrocarbons which are more reactive is not necessarily precluded. For example, vaporized propylene, butylenes and pentenes may be used to supply the necessary heat to the mixture as they undergo polymerization in the reaction zone to increase the yield of olefin polymers and amplify the supply of heat by the release of heat of their reaction. Isobutylene obviously is satisfactory since it forms a product indistinguishable from that formed by polymerizing the absorbed isobutylene. Normal butylenes and propylene are satisfactory if the products of their polymerization can be tolerated in the polymer product of the process.

When the process of this invention is employed to separate isobutylene from the fresh feed to a process for making butadiene the succeeding stages of the latter process may furnish a hydrocarbon mixture which is suitable for use as the heating fluid. After the treatment of a gaseous hydrocarbon mixture, consisting essentially of $C_4$ hydrocarbons and including iso-olefins and normal olefins, in accordance with this process, to effect substantial removal of iso-olefins the remaining unabsorbed hydrocarbon mixture ordinarily is then subjected to a further extraction treatment, for example with acetone, to separate olefins from paraffins. The unabsorbed paraffins from such a treatment ordinarily consist of a mixture of butanes in proportions of isobutane and normal butane which depend upon the character of the process in which the gas mixture is formed. If the original feed is obtained by a thermal cracking treatment of hydrocarbon oils the butane mixture is found to predominate in normal butane, whereas if a catalytic hydrocarbon oil cracking process is the source of the gas mixture the butanes predominate in isobutane. In either case this mixture constitutes a useful heating fluid for use in the present process.

Ordinarily, the mixture of normal butane and isobutane remaining after the extraction of olefins contains a trace of isobutylene and a few per cent of normal butylenes. The presence of these olefins in the heating fluid is not objectionable, however, since they are polymerized along with the isobutylene absorbed in the acid polymerizing catalyst. The presence of the polymers of such olefins in the polymer product is unobjectionable if the polymer product is to be supplied as fresh feed to an alkylation process. If the polymer is to be hydrogenated to iso-octane the presence of a small proportion of normal butenes in the heating fluid is not objectionable for the reason that the high proportion of isobutylene in the reaction zone will result in cross polymerization of the normal butylene with isobutylene, resulting in the production of an iso-octene which can be hydrogenated to an octane of high octane number. The use of a gas mixture from this source as the heating fluid in this process is particularly advantageous if the gases are obtained originally from a catalytic cracking process and if the polymer product is to be employed as fresh feed to an alkylation process since, as pointed out above, such a mixture predominates in isobutane.

While in the above discussion of suitable heating fluids specific reference is made only to hydrocarbons, it is to be understood that the invention is not limited to the use of hydrocarbons as heating fluids. Any suitable fluid may be used which does not form undesired reaction products. Consequently, fluids other than hydrocarbons which meet this necessary requirement may be used, particularly those which may be mixed with the olefin-acid extract in a vaporized condition and which are condensed by contact with the extract at the reaction temperature and pressure. For examples of suitable heating fluids other than hydrocarbons reference may be made to the ethers, such as dimethyl ether and diethyl ether, alkyl chlorides such as methyl chloride and ethyl chloride. The ethers are preferable because of their relative inertness under the polymerization reaction conditions.

The invention will be described further in connection with the specific application thereof to the polymerization of isobutyene. In connection with such further description reference will be made to the accompanying drawing which illustrates diagrammatically an assemblage of apparatus for carrying out the specific application of the invention to the polymerization of isobutylene. It is to be understood, however, that the invention is not limited by such specific reference to the polymerization of isobutylene or by the reference to a specific assemblage of apparatus since the principles of operation illustrated are applicable to the polymerization of other olefins, including normal olefins and diolefins, by means of other combinations of apparatus and operating steps and by means of liquid polymerizing catalysts and operating conditions other than those referred to specifically.

Referring to the drawing, the polymerization reaction is carried out in reactor 1 which is an elongated lead lined, acid-brick lined cylindrical vessel adapted to withstand the application of substantial pressure. Preferably, reactor 1 is filled with some suitable acid resistant packing such as ceramic Raschig rings. The interior of reactor 1 communicates at one end thereof with a lead lined mixing nozzle 2.

The acid-isobutylene extract is supplied to the operation through line 3 which connects with mixing nozzle 2. Line 3 is provided with a pump 4 for introducing the extract into nozzle 2 against the pressure maintained in reactor 1.

The heating fluid is introduced in the system through line 5 which is provided with a pump 6. Line 5 connects with an accumulator 7 from which the heating fluid is transferred to mixing nozzle 2 by means of line 8 which connects accumulator 7 with mixing nozzle 2. Line 8 is provided with a pump 9 for introducing the heating fluid into mixing nozzle 2 against the reaction pressure. Heating means 10 is provided in line 8 to heat the heating fluid to the desired temperature. Preferably, the heating fluid is heated at 10 to a temperature sufficiently high to vaporize it under the pressure maintained in line 8 and reactor 1.

As stated above, preferred heating fluids for the polymerization of isobutylene in accordance with the present invention are isobutane and normal butane. The use of normal butane permits the maintenance of a slightly lower pressure in reactor 1 but, on the other hand, the use of isobutane requires only a slightly higher pressure and does not require heating to as high a temperature at 10 to vaporize it. Furthermore, if it is desired to employ the isobutylene polymer product as charging stock to an alkylation operation for the production of iso-octane, the use of isobutane as the heating fluid is advantageous since its presence in the polymer product does not require fractionation prior to charging the polymer to the alkyation process. In this specific example, therefore, isobutane is accumulated at 7 and charged into mixing nozzle 2 at the desired rate after having been vaporized at 10.

The amount of isobutane required for polymerizing each unit of isobutylene charged to the system in the extract through line 3 increases as the concentration of isobutylene in the extract decreases. The molar ratio of $H_2SO_4$ to $C_4H_8$ in the extract may vary from 0.5:1.0 to 4.0:1.0. It is preferable when extracting isobutylene in preparation for the polymerization step to maintain the concentration of isobutylene in the extract supplied through line 3 such that the molar ratio of $H_2SO_4$ to $C_4H_8$ is within the range of 0.7:1 to 1.2:1.0. Higher molar ratios of acid to isobutylene increase the heat requirement of the polymerization step substantially and lower the selectivity of the extraction operation.

It is preferred ordinarily to maintain the polymerization zone at a temperature within the range of 150° to 230° F. Lower temperatures may result in incomplete regeneration of the acid. The use of higher temperatures involves the danger of decomposing the acid. Within the range of temperatures given above the preferred range is 170° F. to 210° F. Within this preferred range the higher temperatures apparently favor rapid polymerization with the formation of a high proportion of isobutylene dimers.

The use of isobutane as the heating fluid requires the application of pressure on the polymerization reactor sufficient to prevent vaporization of isobutane at the reaction temperature. The vapor pressure of isobutane at 170° F. is 170 pounds per square inch (gauge) whereas at 210° F. it is 275 pounds per square inch (gauge). When using isobutane as the heating fluid the vapor pressure of this material at the reaction temperature selected represents the minimum pressure at which it is advisable to operate the polymerizing reactor. When employing normal butane as the heating fluid somewhat lower pressures may be employed, these being governed by the vapor pressure of isobutylene at the reaction temperature. The vapor pressure of isobutylene at 170° F. is 160 pounds per square inch (gauge) whereas at 210° F. it is 255 pounds per square inch (gauge). The vapor pressure of isobutylene at the selected reaction temperature is the minimum pressure at which it is advisable to operate the reactor when employing as the heating fluid normal butane or any other material having a vapor pressure lower than that of isobutylene. The vapor pressure of the isobutane, or isobutylene, at the reaction temperature is higher than the vapor pressure of the reaction mixture, because of the presence therein of lower boiling materials, such as polymers and normal butane. However, the vapor pressure of the isobutane or isobutylene may be taken as a satisfactory minimum for the pressure in the reactor. Preferably, the pressure on the reactor should be maintained somewhat above the indicated minimum. For example, when using isobutane as the heating fluid the operating pressure at 170° F. should be about 200 pounds per square inch (gauge), whereas at 210° F. it should be about 300 pounds per square inch (gauge).

As pointed out above, the heat required to polymerize a given quantity of isobutylene is greater when the concentration of isobutylene in the extract is relatively low. The amount of isobutane, or other heating fluid, which must be injected into mixing nozzle 2 is affected also by the temperature of the extract flowing through line 3, the polymerizing temperature selected and the temperature of the vaporized heating fluid introduced into mixing nozzle 2.

The latent heat of condensation of isobutane varies from 112 B. t. u. per pound of isobutane at a pressure of 200 pounds per square inch (gauge) to 118 B. t. u. per pound of isobutane at a pressure of 300 pounds per square inch (gauge). Additional heat may be made available to the reaction zone from the isobutane by superheating the isobutane vapors or by cooling the liquid isobutane from its boiling point to the reaction temperature. The variation in the quantity of isobutane required for various operating conditions and various concentrations of isobutylene in the extract when the extract flowing through line 3 is supplied to mixing nozzle 2 at 95° F. and when the vaporized isobutane is supplied to the mixing nozzle 2 through line 8 at a temperature of 300° F. may be summarized in the following table:

| Mol ratio of $H_2SO_4:C_4H_8$ in extract | 0.75:1.0 | | 1.0:1.0 | |
|---|---|---|---|---|
| Polymerization temperature, °F | 175 | 210 | 175 | 210 |
| Polymerization pressure, pounds per square inch (gauge) | 200 | 300 | 200 | 300 |
| Heat available per pound isobutane, B. t. u. | 185 | 150 | 185 | 150 |
| Pounds of isobutane required to polymerize each pound of isobutylene to di-isobutylene | 1.23 | 1.89 | 1.45 | 2.28 |

The vaporized isobutane and extract are intimately mixed by suitable contact means in mixing nozzle 2 whereby the isobutane is condensed and the resulting mixture is brought to the preselected reaction temperature. The reaction mixture then flows through the elongated reactor 1 at a rate which provides the holding time necessary to effect substantially complete polymerization of the isobutylene. Necessarily, the holding time in reactor 1 will be governed by the polymerizing temperature since this reaction proceeds at higher rates, the higher the temperature. Within the range of conditions set forth above a holding time of 15 minutes ordinarily will be the maximum time required, and a holding time of 3 to 5 minutes ordinarily is found to be preferable.

The temperature of the reaction mixture flowing through the reactor varies but little from the initial temperature assumed by the reaction mixture formed by the rapid and intimate mixing of the isobutane and extract. The formation of polymers from the tertiary butyl alcohol and tertiary butyl esters, which are the forms in which the isobutylene is retained in the extract, occurs through reactions which are endothermic. It would be expected, therefore, that the occurrence of such reactions in the mixture as the latter flows through the elongated reaction zone would lower the temperature of the reaction mixture progressively along the path of flow of the reactants. However, the initial heating of the extract by admixture thereof with the vaporized isobutylene results in the regeneration of isobutylene as such from the extract. The reactions by which such regeneration occurs also are endothermic, so that a portion of the heat supplied at the point of mixing of the isobutylene and extract is absorbed by the endothermic reactions resulting in the release of isobutylene. However, isobutylene thus released polymerizes to di-isobutylene during the passage of the reaction mixture through the reaction zone. This reaction is highly exothermic and serves to supply the heat which is absorbed by the reactions by which di-isobutylene is produced directly from the tertiary butyl alcohol and tertiary butyl esters contained in the extract. Consequently, once the reaction mixture is heated to the desired reaction temperature by the cooling and condensation of the vaporized isobutane the reactions resulting in the formation of di-isobutylene apparently do not absorb or generate sufficient heat to affect materially the temperature of the reaction mixture.

In the preparation of di-isobutylene for hydrogenation to iso-octane it is desirable, for obvious reasons, to operate under conditions which promote the formation of dimers and minimize the formation of trimers. It is found also that dimers are preferable to trimers in a polymer feed for an alkylation operation process since the consumption of acid in the alkylation process is lower when alkylating dimers than when alkylating trimers. It is desirable, therefore, to heat the reaction mixture rapidly to a relatively high polymerizing temperature, limit the holding time at the polymerizing temperature to that necessary to effect maximum formation of di-isobutylene, and then quickly lower the temperature of the reaction mixture to the point at which polymerization is substantially inhibited.

When operating in this manner it is desirable that the reaction mixture emerging from reactor 1 be cooled rapidly to a temperature at which polymerization is substantially inhibited. Slow cooling maintains the mixture for an excessive period of time in the relatively low range of polymerizing temperatures at which formation of trimers is favored. Such rapid cooling of the reaction mixture may be accomplished by any suitable means. It is preferred, however, in this process to effect such rapid cooling by quenching with a cooling fluid the reaction mixture emerging from reactor 1 to a temperature sufficiently low to minimize corrosion in equipment through which the mixture passes subsequently. Any suitable fluid may be used for this purpose, the requirements of such a fluid being substantially the same as those set forth above for the heating fluid except that materials which would be less desirable as heating fluids because of their reactivity at the higher temperatures may be used to quench the reaction mixture. Conveniently, the same fluid employed for heating purposes also may be employed as the quench. In the specific example illustrated in the drawing a portion of the isobutane supplied through line 8 is diverted therefrom through line 11. Cooling means 12 may be provided in line 11 if desired to chill the isobutane to a still lower temperature prior to the use thereof as the quench. For rapid and intimate mixing of the reaction mixture and the quench fluid a mixing nozzle 13, which is preferably lead lined and may be similar in construction to mixing nozzle 2, is provided at the exit of reactor 1. Line 11 connects with mixing nozzle 13 in order to supply the with mixing nozzle 13 in order to supply the hot reaction liquid isobutane for quenching the hot reaction mixture as it emerges from reactor 1. A sufficient quantity of the cooling fluid is preferably supplied through line 11 so that the resulting mixture thereof with the reaction products will have a temperature of from 120° to 150° F.

The quenched mixture in mixing nozzle 13 is withdrawn therefrom through line 14 which connects with a cooler 15 for cooling the mixture to a still lower temperature. Cooler 15 conveniently takes the form of a coil 16 maintained in indirect heat exchange with cooling water.

The mixture passing through coil 16 is cooled preferably to a temperature of about 100° F. and emerges therefrom into line 17 which connects coil 16 with a settler 18. Settler 18 may be operated at the same pressure as cooler 15 and reactor 1, but if a lower pressure is desired a valve 19 may be provided in line 17 for the necessary release of pressure.

In settler 18 the mixture of polymer and acid is permitted to separate into a lower acid layer and an upper hydrocarbon layer. The regenerated acid constituting the acid layer is withdrawn from settler 18 through line 20 for return to the olefin extraction operation. The hydrocarbon layer including polymers and isobutane is withdrawn from settler 18 through line 21 which connects with neutralizer 22.

In order to neutralize the acid content of the hydrocarbon mixture flowing through line 21 alkali is introduced into the mixture through line 23 which connects with line 21. The hydrocarbons and alkali are intimately mixed by passage thereof through mixing nozzle 24, and the resulting mixture is then permitted to separate in the settling zone of neutralizer 22. The alkali separates as a lower phase and is withdrawn through line 25. If desired a portion of this material may be recirculated through line 26 which connects line 25 with line 23. The neutralized hydrocarbon mixture which separates in neutralizer 22 as an upper layer is withdrawn therefrom through line 27 which connects with fractionator 28.

The hydrocarbon mixture may be preheated as desired by heating means 29 located in line 27 prior to its introduction thereof into fractionator 28. In fractionator 28 the hydrocarbon mixture is subjected to fractionating conditions adapted to separate overhead the isobutane employed as the heating and quenching fluids as well as accompanying materials of similar boiling characteristics such as unconverted isobutylene. This material passes overhead from fractionator 28 through line 30 which is provided with condensing means 31 and which connects with accumulator 32. From accumulator 32 the concumulator 32. From accumulator 32 the condensate is withdrawn through line 33 provided with pump 34. Line 33 connects with accumulator 7 whereby material flowing therethrough is returned for reuse as heating or quenching fluid. A portion of the condensate flowing through line 33 may be diverted to line 35 and returned to the upper portion of fractionator 28 as reflux.

The polymer product of the process is withdrawn from the lower portion of fractionator 28 through line 36 for further handling. This material may be used directly as an ingredient of motor fuel but preferably is hydrogenated prior to such use. This material also may be employed as feed stock for an alkylation process.

If the polymer product is to be employed in an alkylation process and if isobutane is employed as the heating and quenching fluid in the polymerization process it may be desirable to eliminate the fractionation step carried out at 28. All or a portion of the material flowing through line 27 may be diverted therefrom through line 37 for passage directly to an alkylation reactor. Cooling means 38 may be provided in line 37 to reduce the temperature of this material to that of the alkylation reactor. When operating in this manner the isobutane required for heating and quenching in the polymerization process may be recovered from the alkylation process as a portion of the isobutane normally recycled in that process.

I claim:

1. In the method of converting olefin hydrocarbons in which olefin hydrocarbons are absorbed in an acid polymerizing catalyst at temperatures below polymerizing temperatures and the extract thus obtained is heated under pressure to a temperature sufficiently high to polymerize the absorbed olefins in the liquid phase, the improvement which comprises mixing said extract while at a temperature below polymerizing temperatures and at the polymerizing pressure with hydrocarbon vapors comprising at least a substantial proportion of an isoparaffin hydrocarbon boiling above the polymerizing temperature at the polymerizing pressure in proportions which produce a resulting mixture of extract and condensed vapors which is at the desired polymerizing temperature, separating from the resulting polymerized product regenerated acid catalyst and a hydrocarbon mixture comprising the polymers and the isoparaffin hydrocarbon, recycling said regenerated acid catalyst to said absorption step, and subjecting said hydrocarbon mixture comprising olefin polymers and the isoparaffin hydrocarbon to alkylation reaction conditions.

2. In the method of converting relatively low boiling olefin hydrocarbons in which such low boiling olefins are absorbed in an acid polymerizing catalyst at temperatures below polymerizing temperatures and the extract thus obtained is heated under pressure to a temperature sufficiently high to polymerize the absorbed olefins in the liquid phase, the improvement which comprises mixing said extract while at a temperature below polymerizing temperatures with hydrocarbon vapors comprising at least a substantial proportion of an isoparaffin hydrocarbon boiling not substantially lower than said absorbed olefins in proportions which produce a resulting mixture of extract and condensed vapors which is at the desired polymerizing temperature, maintaining the pressure on the mixture undergoing polymerization sufficiently high to maintain said olefins and condensed vapors substantially completely in a liquid condition, separating from the resulting polymerized product regenerated acid catalyst and a hydrocarbon mixture comprising olefin polymers and said isoparaffin hydrocarbon, recycling said regenerated acid catalyst to said absorption step, and subjecting said hydrocarbon mixture comprising olefin polymers and said isoparaffin hydrocarbon to alkylation reaction conditions.

3. In the method of converting butene in which butene is absorbed in an acid polymerizing catalyst at temperatures below polymerizing temperatures and the extract thus obtained is heated under pressure to a temperature sufficiently high to polymerize the absorbed butene in the liquid phase, the improvement which comprises mixing said extract while at a temperature below polymerizing temperatures and at the polymerizing pressure with hydrocarbon vapors comprising at least a substantial proportion of isobutane in proportions which produce a resulting mixture of extract and condensed hydrocarbons which is at the desired polymerizing temperature, separating from the resulting polymerized product regenerated acid catalyst and a hydrocarbon mixture comprising butene polymers and isobutane, recycling said regenerated acid catalyst to said absorption step, and subjecting said hydrocarbon mixture comprising isobutane and butene polymers to alkylation reaction conditions.

4. In the method of converting butene in which butene is absorbed in an acid polymerizing catalyst at temperatures below polymerizing temperatures and the extract thus obtained is heated under pressure to a temperature sufficiently high to polymerize the absorbed butene in the liquid phase, the improvement which comprises mixing said extract while at a temperature below polymerizing temperatures and at the polymerizing pressure with isobutane vapors in proportions which produce a resulting mixture of extract and condensed isobutane which is at the desired polymerizing temperature, separating from the resulting polymerized product regenerated acid catalyst and a mixture of butene polymers and isobutane, recycling said regenerated acid catalyst to said absorption step, and subjecting said mixture of butene polymers and isobutane to alkylation reaction conditions.

5. In the method of converting butene in which butene is absorbed in an acid polymerizing catalyst at temperatures below polymerizing temperatures and the extract thus obtained is heated under pressure to a temperature sufficiently high to polymerize the absorbed butene in the liquid phase, the improvement which comprises mixing said extract while at a temperature below polymerizing temperatures and at the polymerizing pressure with hydrocarbon vapors comprising at least a substantial proportion of isobutane in proportions which produce a resulting mixture of extract and condensed hydrocarbons which is at the desired polymerizing temperature, permitting the mixture to remain at the polymerizing temperature for a time sufficient to effect the desired polymerization of butene, then admixing the reaction mixture with a sufficient quantity of relatively cold liquid hydrocarbons comprising at least a substantial proportion of isobutane to reduce the temperature of the mixture from the polymerizing temperature to a non-polymerizing temperature, separating from the resulting polymerized product regenerated acid catalyst and a hydrocarbon mixture comprising butene polymers and isobutane, recycling said regenerated acid catalyst to said absorption step, and subjecting said hydrocarbon mixture of isobutane and butene polymers to alkylation reaction conditions.

6. In the method of converting olefin hydrocarbons in which olefin hydcarbons are absorbed in an acid polymerizing catalyst at temperatures below polymerizing temperatures and the extract thus obtained is heated under pressure to a temperature sufficiently high to polymerize the absorbed olefins in the liquid phase, the improvement which comprises mixing said extract while at a temperature below polymerizing temperatures and at the polymerizing pressure with vapors of an isoparaffin hydrocarbon boiling above the polymerizing temperature at the polymerizing pressure in proportions which produce a resulting mixture of extract and condensed isoparaffin hydrocarbons which is at the desired polymerizing temperature, permitting the mixture to remain at the polymerizing temperature for a time sufficient to effect the desired polymerization and regenerate the polymerizing catalyst, thereafter separating the resulting mixture of isoparaffin hydrocarbons and olefin polymers from the accompanying acid catalyst, recycling acid catalyst thus separated to said absorption step, and subjecting the said hydrocarbon mixture of isoparaffin hydrocarbons and olefin polymers to alkylation reaction conditions.

7. The method of treating a hydrocarbon mixture comprising normal olefins and iso-olefins which comprises contacting said mixture with an acid polymerizing catalyst at temperatures below polymerizing temperatures and sufficiently low to absorb a portion only of said olefin hydrocarbons predominating in iso-olefins, separating the resulting extract from unabsorbed hydrocarbons, mixing with said extract while at a temperature below polymerizing temperatures and at the polymerizing pressure with vapors of an isoparaffin hydrocarbon boiling above the polymerizing temperature at the polymerizing pressure in proportions which produce a resulting mixture of extract and condensed isoparaffin vapors which is at the desired polymerizing temperature, maintaining the mixture at the polymerizing temperature for a time sufficient to effect polymerization of the olefin hydrocarbons and regeneration of the acid catalyst, thereafter separating from the acid catalyst a mixture of olefin polymers and isoparaffin hydrocarbons, recycling said separated acid catalyst to said absorption step, and subjecting said mixture of olefin polymers and isoparaffin hydrocarbons to alkylation reaction conditions.

8. A method for treating a low boiling hydrocarbon mixture comprising normal butylenes and isobutylene which comprises contacting said mixture with an acid polymerizing catalyst at temperatures sufficiently low to avoid polymerization and effect absorption of a portion only of said butylenes predominating in isobutylene, separating the extract thus obtained from unabsorbed hydrocarbons, mixing the extract while at a temperature below polymerizing temperature and at the polymerizing pressure with butane vapors comprising at least a substantial proportion of isobutane in proportions which produce a resulting mixture of extract and condensed vapors which is at the desired polymerizing temperature, separating from the resulting polymerized product a mixture of butylene polymers and isobutane and regenerated acid catalyst, recycling said regenerated acid catalyst to said absorption step, and subjecting said mixture comprising butylene polymers and isobutane to alkylation reaction conditions.

9. A method for treating a low boiling hydrocarbon mixture comprising normal butylenes and isobutylene which comprises contacting said mixture with an acid polymerizing catalyst at temperatures sufficiently low to avoid polymerization and effect absorption of a portion only of said butylenes predominating in isobutylene, separating the extract thus obtained from unabsorbed hydrocarbons, mixing the extract while at a temperature below polymerizing temperature and at the polymerizing pressure with butane vapors comprising at least a substantial proportion of isobutane in proportions which produce a resulting mixture of extract and condensed vapors which is at the desired polymerizing temperature, maintaining the mixture at the polymerizing temperature for a time sufficient to effect substantially complete polymerization of the absorbed butylene and regeneration of the acid catalyst, then admixing with the reaction mixture a sufficient quantity of cold liquid butane comprising at least a substantial proportion of isobutane to reduce the temperature of the mixture to a non-polymerizing temperature, separating a hydrocarbon mixture comprising isobutane and butylene polymers and regenerated acid catalyst, recycling said regenerated acid catalyst to said absorption step, and subjecting said hydrocarbon mixture comprising isobutane and butylene polymers to alkylation reaction conditions.

10. A method for treating a low boiling hydrocarbon mixture comprising normal butylenes and isobutylene which comprises contacting said mixture with a sulphuric acid polymerizing catalyst at temperatures sufficiently low to avoid polymerization and effect absorption of a portion only of said butylenes predominating in isobutylene, separating the extract thus obtained from unabsorbed hydrocarbons, mixing the extract while at a temperature below polymerizing temperature and at the polymerizing pressure with butane vapors comprising at least a substantial proportion of isobutane in proportions which produce a resulting mixture of extract and condensed vapors which is at the desired polymerizing temperature, maintaining the mixture at the polymerizing temperature for a time sufficient to effect substantially complete polymerization of the absorbed butylene and regeneration of the sulphuric acid catalyst, then admixing with the reaction mixture a sufficient quantity of cold liquid butane comprising at least a substantial proportion of isobutane to reduce the temperature of the mixture to a non-polymerizing temperature, separating a hydrocarbon mixture comprising isobutane and butylene polymers and regenerated sulphuric acid catalyst, recycling said regenerated sulphuric acid catalyst to said absorption step, and subjecting said hydrocarbon mixture comprising isobutane and butylene polymers to alkylation reaction conditions.

11. In the method of converting butene in which butene is absorbed in an acid polymerizing catalyst at temperatures below polymerizing temperatures and the extract thus obtained is heated under pressure to a temperature sufficiently high to polymerize the absorbed butene in the liquid phase, the improvement which comprises mixing said extract while at a temperature below polymerizing temperatures and at the polymerizing pressure with isobutane vapors in proportions which produce a resulting mixture of extract and condensed isobutane which is at the desired polymerizing temperature, separating from the resulting polymerized product regenerated acid catalyst and a mixture of butene polymers and isobutane, recycling said regenerated acid catalyst to said absorption step, subjecting said mixture of butene polymers and isobutane to alkylation reaction conditions, recovering unreacted isobutane from the alkylation reaction, and recycling said unreacted isobutane to said polymerization step.

12. A method for processing a hydrocarbon gas produced by cracking treatment of hydrocarbon oil and containing isobutylene, normal butylene, and isobutane, which comprises absorbing the isobutylene content of said gas in an acid polymerizing catalyst at temperature below polymerizing temperature, treating unabsorbed gas to separate normal butene therefrom whereby a relatively paraffinic residual fraction containing isobutane is produced, vaporizing at least a portion of said residual isobutane fraction at a pressure effective for polymerizing said isobutylene, mixing the isobutylene extract while at a temperature below polymerizing temperatures and at the polymerizing pressure with said vaporized isobutane fraction in proportions which produce a resulting liquid mixture which is at the desired polymerizing temperature, separating from the resulting polymerized product regenerated acid catalyst and a mixture of butene polymers and isobutane, recycling said regenerated acid catalyst to said absorption step, and subjecting said mixture of butene polymers and isobutane to alkylation reaction conditions.

13. In a process of producing higher boiling hydrocarbons from isobutane and isobutylene wherein an absorption product of isobutylene in sulfuric acid is heated to polymerize at least a part of said isobutylene and polymers thus formed are reacted with isobutane in the presence of an alkylation catalyst, the improvement which comprises adding isobutane in the vapor phase under a pressure high enough to condense isobutane and supply heat for said polymerization and to produce substantially dry isobutane and feeding resulting polymer and substantially dry isobutane to the alkylation unit.

14. A process of producing higher boiling hydrocarbons from isobutane and an olefin which comprises adding isobutane in the vapor phase to an absorption product of said olefin in sulfuric acid under a pressure between about the vapor pressure of isobutane at 150° F. and about 300 pounds per square inch at which isobutane condenses and supplies heat for polymerization of said absorbed olefin and substantially dry isobutane is produced and contacting resulting polymer and substantially dry isobutane with an alkylation catalyst under alkylating conditions.

15. In a process of producing higher boiling hydrocarbons from isobutane and an olefin wherein an absorption product of said olefin in an inorganic acid of polymerization strength is heated to polymerize at least a part of the olefin content and polymers thus formed are reacted with isobutane in the presence of an alkylation catalyst, the improvement which comprises adding isobutane in the vapor phase under a pressure high enough to condense isobutane and supply heat for said polymerization and to produce substantially dry isobutane and feeding resulting polymer and substantially dry isobutane to the alkylation unit.

ARNOLD BELCHETZ.